United States Patent [19]

Choi

[11] Patent Number: 5,644,419
[45] Date of Patent: Jul. 1, 1997

[54] MIRROR FIXING DEVICE FOR A MOTOR EMPLOYING A BEAM REFLECTOR

[75] Inventor: Cheon Choi, Kyunggi-Do, Rep. of Korea

[73] Assignee: Samsung Electro-Mechanics Co., Ltd., Kyunggi-do, Rep. of Korea

[21] Appl. No.: 509,360

[22] Filed: Jul. 31, 1995

[30] Foreign Application Priority Data

Jul. 30, 1994 [KR] Rep. of Korea ............... U94-19497

[51] Int. Cl.⁶ ........................................... G02B 26/08
[52] U.S. Cl. ........................... 359/198; 359/200; 359/216
[58] Field of Search .................... 359/198–200, 359/216–219, 871–872; 384/397; 464/170

[56] References Cited

FOREIGN PATENT DOCUMENTS

| 4-204625 | 7/1992 | Japan | 359/198 |
| 4-353817 | 12/1992 | Japan | 359/198 |
| 5-134201 | 5/1993 | Japan | 359/198 |

*Primary Examiner*—James Phan
*Attorney, Agent, or Firm*—Lowe, Price, LeBlanc & Becker

[57] ABSTRACT

A mirror fixing device for a motor employing a beam reflector which can uniformly fix the beam reflector to a motor housing as well as prevent gas leakage from the housing. The device includes a cap having a body and a plurality of mirror fixing members united to the body. The body of the cap is capped on the top portion of the housing to prevent the gas leakage, and the mirror fixing members are radially projected from a lower circumferential surface of the body to uniformly press and fix the beam reflector to the housing.

2 Claims, 2 Drawing Sheets

5,644,419

MIRROR FIXING DEVICE FOR A MOTOR EMPLOYING A BEAM REFLECTOR

BACKGROUND OF THE INVENTION

1. Field of the Invention

The present invention relates to a mirror fixing device for a motor employing a beam reflector. More particularly, this invention relates to a mirror fixing device for a motor employing a beam reflector that fixes a mirror with prevention of gas leakage.

2. Description of the Prior Art

Generally, a motor employing a beam reflector such as a scanner motor for use in a laser beam printer, a digital copier or the like requires a device for fixing a beam-reflecting mirror and a structure for preventing an evaporated lubricant such as a grease leaking from a motor housing.

In a conventional scanner motor 10, with reference to FIG. 1, a shaft holder 12 is provided at the central portion of a printed circuit board 11 for providing a driving current to the motor. In this holder 12, a motor shaft 13 is inserted.

A supporter 14 is mounted on one part of the printed circuit board 11. The supporter 14 supports a stator core 15 which is manufactured by press-manufacturing and laminating silicic metal plates. A coil 16 is wound on this stator core 15, and electronic components 17 mounted on the printed circuit board 11 apply a driving current to the coil 16.

Meanwhile, the motor shaft 13 is rotatably supported by bearings 18 and 18'. The upper bearing 18 is fixed by a fixing ring 20 which clamps the shaft 13 and by an elastic member 21 inserted between the upper bearing 18 and the fixing ring 20. The lower bearing 18' is fixed by the shaft holder 12 when assembled.

These bearings 18 and 18' are equipped inside a housing 22. Around the outer circumferential surface of the housing 22, a rotor yoke 23 is assembled. A magnet 24 for forming a magnetic field is attached to the end part of the rotor yoke 23. This magnet 24 rotates the rotor yoke 23 in interaction with the energized coil 16, resulting in rotation of the housing 22.

In addition, on a shoulder 25 formed around the outer surface of the housing 22, a polygon mirror 26 for reflecting a laser beam to focus an image on a photoconductive drum, is mounted. The mirror 26 rotates with an extremely high speed to line-scan an image read out from a paper on the photoconductive drum. To increase image accuracy, the reflection factor of the mirror must be secured over 99 percent, requiring a device for uniformly fixing the mirror.

To meet this requirement, the conventional motor is provided with the fixing ring 20 and elastic members 21 as shown in FIG. 1.

In addition, the bearings 18 and 18' play a role in smoothing the rotation of the housing 22 mounting the polygon mirror 26. To help this, a lubricant such as grease is necessarily applied to the bearings 18 and 18'. However, due to the high-speed bearing rotation, the lubricant is apt to be boiled and vaporized, and the vaporized lubricant gas leaks out of the housing. This leaking gas has a bad effect on neighboring parts, and particularly when adhering to the mirror, the image is severely distorted.

To avoid this problem, a device for preventing the gas leakage has been developed. Referring to FIG. 1, it can be noted that a cap 27 is put on the top opening of the housing 22. The cap 27 hermetically seals the housing 22 so as to prevent the gas from leaking.

However, such conventional devices must individually employ a fixing ring and elastic members for fixing a polygon mirror and a cap for preventing gas leakage, and this causes a complicated structure and increased work time. Accordingly, workability, productivity, and reliability are lowered, and thus the production cost are increased.

SUMMARY OF THE INVENTION

It is an object of the present invention to provide a mirror fixing device for a motor employing a beam reflector which can properly fix a mirror as well as prevent gas leakage by a one-bodied cap rather than a separate mirror fixing device and a gas leakage prevention cap as in the conventional motor.

In order to achieve the above object, there is provided a mirror fixing device for a motor employing a beam reflector, having a housing, a polygon mirror, installed on a circumferential surface of said housing, for reflecting a beam, a motor shaft rotatably installed inside said housing, and a bearing, installed between said motor shaft and said housing, for rotatably supporting said motor shaft, the mirror fixing device comprising:

a cap having a body and a plurality of mirror fixing members united to said body, said body being capped on a top portion of said housing to prevent a gas from leaking from said housing, said mirror fixing members being radially projected from a lower circumferential surface of said body to uniformly press and fix said polygon mirror to said housing.

BRIEF DESCRIPTION OF THE DRAWINGS

The above object and other advantages of this invention become more apparent by describing the following embodiment with reference to the accompanying drawings, in which.

DETAILED DESCRIPTION OF THE PREFERRED EMBODIMENT

Hereafter, a preferred embodiment of a mirror fixing device for a motor employing a beam reflector according to the present invention will be explained with reference to the accompanying drawings.

Figure 1:
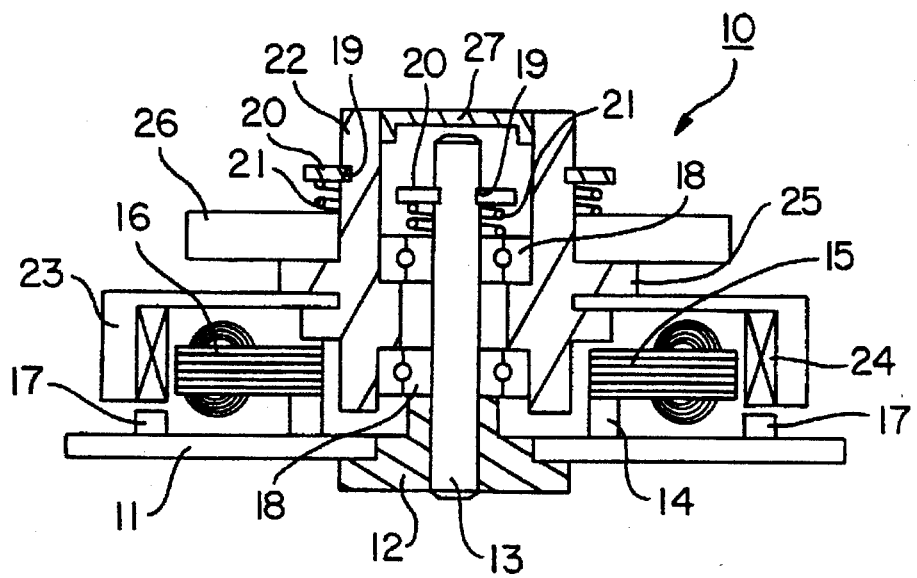
FIG. 1 is a sectional view showing a conventional motor employing a beam reflector.
Figure 2:
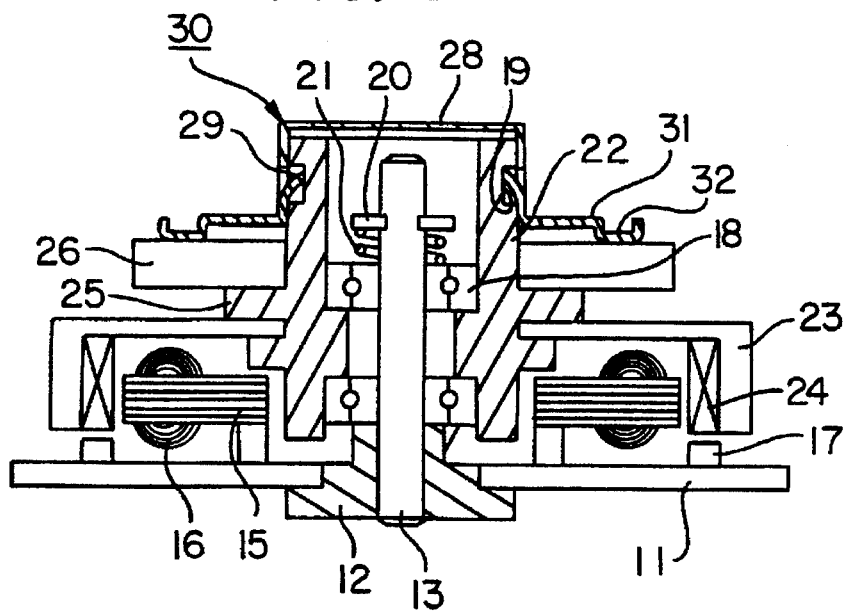
FIG. 2 is a sectional view showing the mirror fixing device for a motor employing a beam reflector according to the present invention.

FIG. 2 is a sectional view of a motor of this invention. Reference numerals in FIG. 2 that are the same as those in FIG. 1 teach the same parts, so their description will be omitted and only the essential elements for this invention will be explained.

Referring to FIG. 2, it can be noted that a one-bodied cap 30 takes the place of both the conventional fixing ring 20 and elastic members 21 for fixing the mirror 26, and the cap 27 for preventing the gas leakage as shown in FIG. 1.

Specifically, the sole cap 30 functions to fix the mirror 26 and to prevent the gas leakage, simultaneously. Top opening of the housing 22 is covered with the body 28 of the cap 30 so as to prevent the vaporized lubricant gas from leaking out of the housing 22. Around the body 28, a plurality of elastic members 29 are formed, being bent inwardly at regular angles. These members are latched with recess grooves 19 formed on the circumferential surface of the housing 22 so as to prevent the cap 30 from leaving the housing 22.

In addition, on the lower part of the body 28, a plurality of supporting members having a given elasticity are formed so as to uniformly press and fix the polygon mirror 26.

Figure 3:
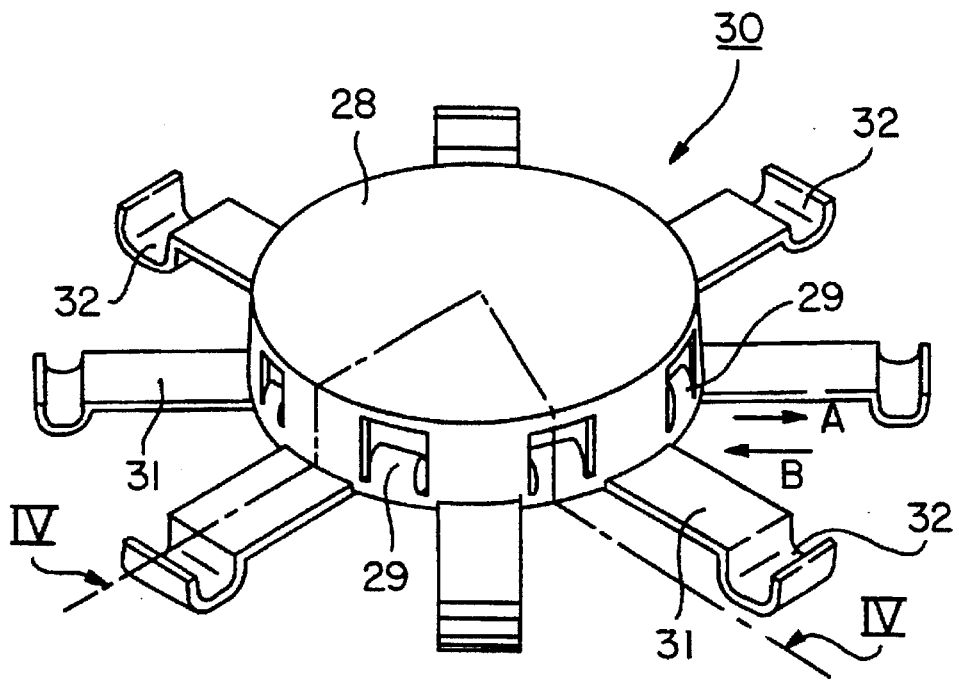
FIG. 3 is a perspective view of a cap depicted in FIG. 2.

FIG. 3 is a persective view of the cap 30 depicted in FIG. 2. As described above, the cap 30 is composed of the body 28 whose top portion is closed and a plurality of supporting members 31 each of which has a regular elasticity. Besides, on the circumferential surface of the body 28, a plurality of elastic members 29 are formed. Since these members 29 are bent inwardly, once the head 28 is assembled with the housing 22, the head 28 itself cannot depart from the housing 22. This is because the elastic members 29 are latched with the recess grooves 19 of the housing 22 as shown in FIG. 2.

At the ends of the respective supporting members 31, pressing members 32 are formed, being curved at a given curvature. These pressing members 32 uniformly press the mirror 26 to firmly support the mirror.

Figure 4:
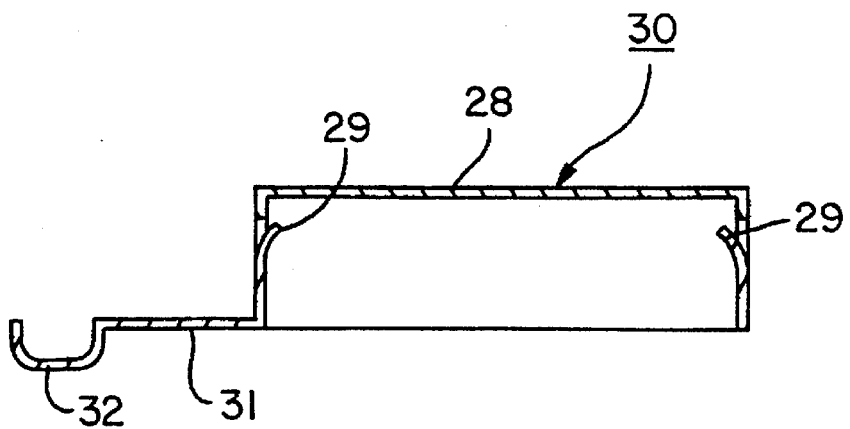
FIG. 4 is a sectional view taken along the line IV—IV of FIG. 3.

FIG. 4 is a sectional view of the cap depicted in FIG. 3. Referring to FIG. 3, the supporting members 31 are projectly formed on the lower circumferential surface of the body 28. The elastic members 29 are bent inwardly, being severed from a part of the head 28 and thus the members 29 have a given elasticity to be locked to the recess grooves 19.

In the present motor as constructed above, when the cap 30 is pressed downwardly to the housing 22, the elastic members 29 are thrusted in the direction of "A" in FIG. 3 by the circumference of the housing 22. If pressing the cap 30 consecutively, the elastic members 29 thrusted in the direction of "A" in FIG. 3 is returned to their original positions, i.e., in the direction of "B" in FIG. 3 by the recess grooves 19 of the housing 22. Thus, the elastic members 29 are latched with the recess grooves 19, and thus the cap 30 cannot leave the housing 22. Besides, since the inner surface of the head 28 adheres closely to the outer circumferential surface of the housing 22, the gas leakage can be prevented.

At this time, the pressing members 32 fromed on the supporting members 31 press the mirror 26 at a uniform pressure, and thus the mirror 26 is firmly and evenly fixed to the housing 22.

From the foregoing, since the one-bodied cap 30 can fix the mirror 26 as well as prevent the gas leakage, a manufacturing process can be simplified and thus the productivity can be improved. Further, reduction of the number of components increases the reliability of a product and decreases the manufacturing cost.

While specific embodiment of the present invention has been shown and described, further modifications and improvements will occur to those skilled in the art. All such modifications which retain the basic underlying principles disclosed and claimed herein are within the scope of this invention.

What is claimed is:

1. A mirror fixing device for a motor employing a beam reflector in the form of a polygon mirror installed on a circumferential surface of a housing to reflect a beam, a motor shaft rotatably installed inside said housing, and a bearing, installed between said motor shaft and said housing, for rotatably supporting said motor shaft, said mirror fixing device comprising:

a cap having a body and mirror fixing members connected to said body, said body being capped on a top portion of said housing to prevent a gas from leaking from said housing, said mirror fixing members extending radially at regular intervals from said body to evenly press and fix said polygon mirror to said housing, wherein end portions of said respective mirror fixing members are curved and firmly press said polygon mirror; wherein said housing comprises a plurality of recess grooves on a circumferential surface thereof and said body of said cap includes a circumferentially extending portion having a plurality of elastic members which are bent inwardly at a predetermined angle and severed from a part of said circumferentially extending portion to respectively interlock with said recess grooves to retain said cap on said housing.

2. The mirror fixing device of claim 1, wherein said mirror fixing members extend from a lower portion of said circumferentially extending portion.

* * * * *